United States Patent [19]
DeLuca et al.

[11] Patent Number: 5,935,624
[45] Date of Patent: Aug. 10, 1999

[54] LOW PHOSPHORUS ANIMAL FEED CONTAINING 1α-HYDROXYLATED VITAMIN D COMPOUNDS AND METHOD OF PREPARING

[75] Inventors: Hector F. DeLuca, Deerfield, Wis.; David H. Baker, Champaign, Ill.

[73] Assignees: Wisconsin Alumni Research Foundation, Madison, Wis.; Board of Trustees of the University of Illinois, Urbana, Ill.

[21] Appl. No.: 08/969,295

[22] Filed: Nov. 13, 1997

Related U.S. Application Data

[63] Continuation-in-part of application No. 08/757,448, Nov. 27, 1996, abandoned, which is a continuation of application No. 08/452,847, May 30, 1995, abandoned, which is a division of application No. 08/383,952, Feb. 6, 1995, abandoned.

[51] Int. Cl.$^6$ .................................................. A23K 1/175
[52] U.S. Cl. .............................. 426/73; 426/74; 426/623; 426/630
[58] Field of Search ..................... 426/2, 53, 54, 426/73, 74, 623, 630; 514/103

[56] References Cited

U.S. PATENT DOCUMENTS

| | | | |
|---|---|---|---|
| 4,952,415 | 8/1990 | Winowiski | 426/285 |
| 5,154,925 | 10/1992 | Edwards, Jr. | 424/422 |
| 5,316,770 | 5/1994 | Edwards, Jr. | 424/442 |
| 5,366,736 | 11/1994 | Edwards, Jr. | 426/2 |

FOREIGN PATENT DOCUMENTS

| | | |
|---|---|---|
| 0383116 | 8/1990 | European Pat. Off. . |
| WO93/19759 | 10/1993 | WIPO . |

OTHER PUBLICATIONS

Erling Twedegaard, "Absorption of calcium, magnesium and phosphate during chronic renal failure and the effect of vitamin D in rabbits," Zeitschrift Fur Versuchstierkunde, vol. 27, No. 3/4, pp. 163–168, 1985.

Robert R. Biehl et al, "1α–hydroxylated cholecalciferol compounds act additively with microbial phytase to improve phosphorus, zinc and manganese utilization in chicks fed soy–based diets," Journal Of Nutrition, vol. 125, No. 9, pp. 2407–2419, 1995.

Kevin D. Roberson et al, "Effects of 1,25–dihydroxycholecalciferol and phytase on zinc utilization in broiler chicks," Poultry Science, vol. 73, No. 8, pp. 1312–1326, 1994.

R.H. Harms et al, "Some observations on the influence of vitamin D metabolites when added to the diet of commercial laying hens," Poultry Science, vol. 69, No. 3, pp. 426–432, 1990.

K. Hove et al, "Prevention of parturient hypocalcemia: effect of a single oral dose of 1,25–dihydroxyvitamin $D_3$," Journal of Dairy Science, vol. 65, No. 10, pp. 1934–1940, 1982.

Seiji Aoyagi et al, "Effect of microbial phytase and 1,25–dihydroxycholecalciferol on dietary copper utilization in chicks," Poultry Science, vol. 74, No. 1 pp. 121–126, 1995.

Schwarz,"Phytase supplementation and waste management," Proc. BASF Technical Symp. At Arkansas Nutr. Conf., pp. 21–44, 1994.

Devereux et al, "Animal feeds: phosphate supplements," Chemical Economics Handbook–Sir International, 1994.

*Primary Examiner*—Arthur L. Corbin
*Attorney, Agent, or Firm*—Andrus, Sceales, Starke & Sawall

[57] ABSTRACT

An animal feed, preferably a poultry feed, containing an 1α-hydroxylated vitamin D compound. The vitamin D compound causes improved utilization of phosphorus, calcium, potassium, magnesium, zinc, iron and manganese available from inorganic sources in animal feed so as to minimize, or perhaps eliminate, the need for supplemental quantities of these minerals in an animal diet.

18 Claims, No Drawings

LOW PHOSPHORUS ANIMAL FEED CONTAINING 1α-HYDROXYLATED VITAMIN D COMPOUNDS AND METHOD OF PREPARING

CROSS-REFERENCE TO RELATED APPLICATIONS

This application is a continuation-in-part of application Ser. No. 08/757,448 filed Nov. 27, 1996, now abandoned, which in turn is a continuation of Ser. No. 08/452,847 filed May 30, 1995, now abandoned, which in turn is a divisional of application Ser. No. 08/383,952 filed Feb. 6, 1995 now abandoned.

STATEMENT REGARDING FEDERALLY SPONSORED RESEARCH OR DEVELOPMENT

This invention was made with United States government support awarded by the following agencies:

NIH Grant No.: DK-14881

The United States ha certain rights in this invention.

BACKGROUND OF THE INVENTION

Up to 80% of the phosphorus (P) present in plant foods and feeds exists as a complex of phytic acid (myoinositol hexaphosphate), hereinafter referred to as phytate. Phytate may structurally be illustrated by the following formula:

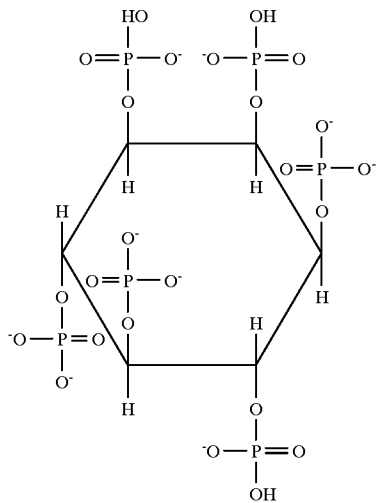

The P in phytate cannot be totally digested by simple-stomached animals, including humans, and it therefore passes through the gastrointestinal (GI) tract and is excreted in the feces. In animal nutrition, this is accounted for in diet formulation whereby 1.5 to 2.5% of an inorganic phosphate source is supplemented to meet the animal's minimal P requirement. Addition of supplemental inorganic P to poultry, swine, companion animal, and fish diets is expensive. It is often stated that supplemental P for these species is the third most expensive dietary ingredient, after energy and protein. The body requires P for formation of bones and teeth, for phospholipid (cell membrane structure) and nucleic acid (RNA, DNA) synthesis, for synthesis of ATP and other high-energy P compounds, and for proper acid-base balance in the body. Roughly 85% of the body P is in the skeleton. Bone is comprised of 50% organic matrix (protein in the form of collagen, and lipid) and 50% inorganic material (mostly a Ca-P salt. i.e., hydroxyapatite).

Supplemental inorganic P is typically provided to animal diets in one of three feedgrade forms; dicalcium phosphate (18.5% P), monocalcium phosphate (21.5% P) or deflorinated phosphate (18.0% P). The combined total market for these products is estimated to be 675 million dollars per year in the U.S., Canada, Mexico, Western Europe and Japan. If one were to include South America, Eastern Europe, Asia, Africa, China, India, and Southeast Asia, (where market data are difficult to obtain), the total market for feed-grade inorganic phosphates could easily be expected to exceed 1 billion dollars annually. In North America, 50% of feed-grade inorganic phosphate consumed is used for poultry feeding. It has been discovered via the present invention that use of a bioactive 1-α-OH vitamin D compound would reduce the need for supplemental inorganic P, and if combined with the enzyme phytase, could reduce the need even more.

In addition to phosphorus, phytate complexes in plant foods and feeds (eg., cereal grains and by-products, beans) also bind cations such as calcium, potassium, magnesium, zinc, iron and manganese (Erdman, 1979). This is illustrated schematically as follows:

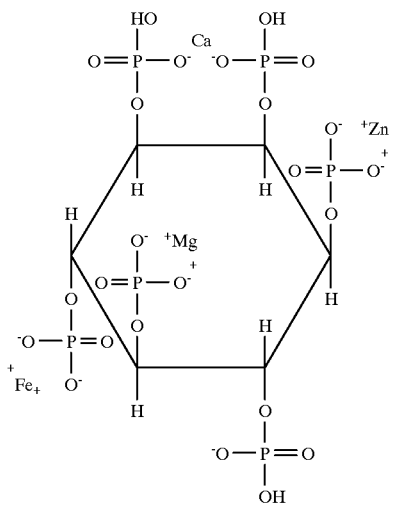

Again, because these minerals cannot be totally digested by animals, they are added as supplements from inorganic sources to the animal's diet. Thus, the present invention has also discovered that a bioactive vitamin D feed additive that causes the utilization of P from inorganic sources should also increase utilization of these additional minerals from inorganic sources as well. The present invention has established that 1-α-OH vitamin D compounds, preferably 1,25 dihydroxycholecalciferol and 1-α-OH cholecalciferol, increase the utilization of not only inorganic P but also inorganic calcium, potassium, magnesium, zinc, iron and manganese. Thus, because these trace elements are always added in supplemental form from inorganic sources to diets for swine, poultry and companion animals (e.g. as feed-grade ZnO or $ZnSO_4.H_2O$; $FeSO_4.H_2O$; MnO or $MnSO_4.H_2O$) use of a bioactive 1-α-OH vitamin D compound would lower, or perhaps eliminate, the need for supplemental quantities of these inorganic minerals (typically added in the form of salts) in a practical-type grain-oilseed meal diet.

By reducing the amount of inorganic P and mineral salts supplemented in the diet, the remaining diet could be formulated to contain more usable energy. Thus, grain-oilseed meal diets generally contain about 3,200 kcal metabolizable energy per kilogram of diet, and mineral salts supply no metabolizable energy. Removal of the unneeded minerals and substitution with grain would therefore increase the usable energy in the diet.

Currently, phytase is being used in much of Europe and Asia to reduce P pollution. The use level, however, is 600 units per kilogram diet, but this level was selected because of cost of the enzyme and not because 600 units will maximize phytate P utilization. In contrast it has been discovered via the present investigation that at least 1200 units/kg diet is required to maximize phytate P utilization in chicks fed a corn-soybean meal diet (Table 1). However, use of a bioactive 1-α-OH vitamin D compound in accordance with the present invention would reduce the need to feed expensive levels of phytase. (Table 5)

Animal producers are currently forced to feed high P diets because of the phytate content of diets. This increases P in the excreta waste products (both feces and urine). Excess P from animal as well as human waste is generally spread on the soil, where a portion of it gets washed into ground water and then into ponds, streams, rivers, lakes and oceans. Too much P in water stimulates growth of algae, and algae take up considerable oxygen. This robs marine life of the oxygen they need to grow, reproduce and thrive.

In many parts of Europe and Asia, P pollution has become such a problem and concern that penalties in the form of stiff financial fines are imposed on livestock producers who spread too much P-laden manure on the soils. Because of this, much of Europe now uses a microbial phytase product (BASF), even though this product (which also hydrolyzes phytate) is very expensive, in fact too expensive to be cost effective (at 600 units/kg diet) as a feed additive in the U.S. at the present time. Many U.S. soils are being described as "P saturated", thus resulting in a greater concentration of P in soil leachates. High-P water leachate in areas such as the Chesapeak Bay has been blamed for excessive algae growth and increased fish kills in bay waters (Ward, 1993). In Europe, the feed industry group FEFANA issued a position paper in 1991 entitled "Improvement of the Environment". They proposed that P in manure from livestock production should be reduced by 30% (Ward, 1993). The limits of P that can be applied to soils in Europe have been discussed by Schwarz (1994). Accordingly, it is estimated that use of a 1-α-OH vitamin D compound that is active in increasing phosphorus utilization in accordance with the present invention, could cut the P content of animal waste products by up to 40%.

Initial work by Edwards, Jr. focused on use of 1,25 dihydroxycholecalciferol (1,25-$(OH)_2D_3$) in the absence or presence of 1200 units of microbial phytase (BASF), and Edwards, Jr. U.S. Pat. No. 5,366,736 (1993) showed that 1,25-$(OH)_2D_3$ is effective in improving P utilization from phytate-bound P, and Biehl et al (1995) confirmed his results. Moreover, both studies showed that 1,25-$(OH)_2D_3$ works additively with microbial phytase in releasing P from dietary phytate complexes. It seems likely that 1,25-$(OH)_2D_3$ exerts is effects in two ways: (a) the 1,25 compound likely increases the activity of intestinal phytases or phosphatases that hydrolyze phytate (Pileggi et al, 1955; Maddaiah et al, 1964) and (b) the 1,25 compound is known to stimulate phosphate transport (Tanka and DeLuca, 1974), facilitating transport of P from GI tract to plasma and hence bone.

Under normal dietary circumstances, cholecalciferol (vitamin $D_3$) that is added to a diet gets absorbed from the GI tract and is transported via blood to the liver where the liver enzyme 25-hydroxylase acts on the compound to cause formation of 25-OH $D_3$. This compound is the normal blood metabolite of cholecalciferol. A small portion of 25-OH $D_3$ undergoes a further hydroxylation step in the kidney, at the 1-α position, causing synthesis of the calciotropic hormone 1,25-$(OH)_2D_3$. Because 1,25-$(OH)_2D_3$ is expensive to synthesize and because oral 25-OH $D_3$ is not the active form in phosphate absorption, it was proposed that 1-α-OH $D_3$ would be an effective compound for increasing phosphate utilization. It has been discovered that 1α-hydroxylated vitamin D compounds and particularly 1-α-OH $D_3$ will be absorbed from the GI tract and then be transported to the liver where 25-hydroxylase would act upon it to bring about synthesis of 1,25-dihydroxylated compounds and particularly 1,25-$(OH)_2D_3$. A portion of these compounds would then be transported back to the GI tract where they would activate intestinal phosphate absorption. The net effect would be an increased utilization of P (also K, Zn, Fe, Mn, Mg and Ca) from the inorganic sources in an animal's diet.

In summary, the potential benefits of the present invention include (1) reduction in the need for inorganic P supplements for animal (including fish) diets; (2) reduction in P pollution of the environment; (3) reduction or possible elimination of the need for supplemental K, Ca, Zn, Mn, Mg and Fe in animal diets; and (4) reduction of the quantity of phytase needed for maximal P utilization from feeds.

DETAILED DESCRIPTION OF THE PREFERRED EMBODIMENT

As used in the description and in the claims, the term hydroxy-protecting group signifies any group commonly used for the temporary protection of hydroxy functions, such as for example, alkoxycarbonyl, acyl, alkylsilyl, and alkoxyalkyl groups, and a protected hydroxy group is a hydroxy function derivatized by such a protecting group. Alkoxycarbonyl protecting groups are groupings such as methoxycarbonyl, ethoxycarbonyl, propoxycarbonyl, isopropoxycarbonyl, butoxycarbonyl, isobutoxycarbonyl, tert-butoxycarbonyl, benzyloxycarbonyl or allyloxycarbonyl. The term "acyl" signifies an alkanoyl group of 1 to 6 carbons, in all of its isomeric forms, or a carboxyalkanoyl group of 1 to 6 carbons, such as an oxalyl, amlonyl, succinyl, glutaryl group, or an aromatic acyl group such as benzoyl, or a halo, nitro or alkyl substituted benzoyl group. The word "alkyl" as used in the description or the claims, denotes a straight-chain or branched alkyl radical of 1 to 10 carbons, in all its isomeric forms. Alkoxyalkyl protecting groups are groupings such as methoxymethyl, ethoxyethyl, methoxyethoxymethyl, or tetrahydrofuranyl and tetrahydropyranyl. Preferred alkylsilyl protecting groups are trimethylsilyl, triethylsilyl, t-butyldimethylsilyl, and analogous alkylated silyl radicals.

The vitamin D compounds useful in the present treatment are 1α-hydroxylated vitamin D compounds, preferably 1α-hydroxycholecalciferol and 1α, 25-dihydroxycholecalciferol. The vitamin D compounds of this type are characterized by the following general structure:

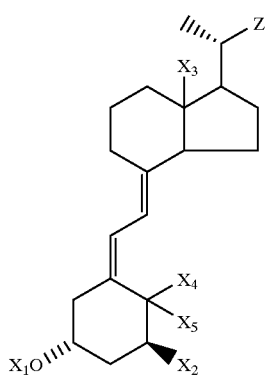

where $X_1$ may be hydrogen or a hydroxy-protecting group, $X_2$ may be hydroxy, or protected hydroxy, $X_3$ may be hydrogen or methyl, X4 and $X_5$ each represent hydrogen or taken together $X_4$ and $X_5$ represent a methylene group, and where Z is selected from Y, —OY, —$CH_2$OY, —C≡CY and —CH=CHY, where the double bond may have the cis or trans stereochemical configuration, and where Y is selected from hydrogen, methyl, —$CR_5$O and a radical of the structure:

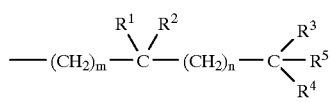

where m and n, independently, represent integers from 0 to 5, where $R^1$ is selected from hydrogen, hydroxy, protected-hydroxy, fluoro, trifluoromethyl, and $C_{1-5}$-alkyl, which may be straight chain or branched and, optionally, bear a hydroxy or protected-hydroxy substituent, and where each of $R^2$, $R^3$ and $R^4$, independently, is selected from hydrogen, fluoro, trifluoromethyl and $C_{1-5}$ alkyl, which may be straight-chain or branched, and optionally bear a hydroxy or protected-hydroxy substituent, and where $R^1$ and $R^2$, taken together, represent an oxo group, or an alkylidene group, =$CR_2R_3$, or the group —$(CH_2)_p$—, where p is an integer from 2 to 5, and where $R^3$ and $R^4$, taken together, represent an oxo group, or the group —$(CH_2)_q$—, where q is an integer from 2 to 5, and where $R^5$ presents hydrogen, hydroxy, protected-hydroxy, or $C_{1-5}$ alkyl.

The above compounds may be administered alone or in combination with other feed additive agents. The above vitamin D compounds or combinations thereof can be readily administered either by mixing them directly into animal feed or separately from the feed by separate oral dosage, by applying them as a top dressing on the feed, by injection or by transdermal means or in combination with other 1α-hydroxylated vitamin D compounds, the proportions of each of the compounds in the combination being dependent upon the particular problem being addressed and the degree of response desired, are generally effective to practice the present invention. In poultry, amounts in excess of about 10 micrograms per day or the combination of that compound with other 1α-hydroxylated vitamin D compounds, are generally unnecessary to achieve the desired results, may result in hypercalcemia, and may not be an economically sound practice. It should be understood that the specific dosage administered in any given case will be adjusted in accordance with the specific compounds being administered, the problem to be treated, the condition of the subject and the other relevant facts that may modify the activity of the compound or the response of the subject, as is well known by those skilled in the art. In general, either a single daily dose or divided daily dosages may be employed, as is well known in the art.

If administered separately from the animal feed, dosage forms of the various compounds can be prepared by combining them with non-toxic pharmaceutically acceptable carriers to make either immediate release or slow release formulations, as is well known in the art. Such carriers may be either solid or liquid such as, for example, corn starch, lactose, sucrose, peanut oil, olive oil, sesame oil and propylene glycol. If a solid carrier is used the dosage form of the compounds may be tablets, capsules, powders, troches or lozenges or top dressing as micro-dispersable forms. If a liquid carrier is used, soft gelatin capsules, or syrup or liquid suspensions, emulsions or solutions may be the dosage form. The dosage forms may also contain adjuvants, such as preserving, stabilizing, wetting or emulsifying agents, solution promoters, etc. They may also contain other therapeutically valuable substances.

The present invention also relates to an animal feed composition, particularly a poultry feed composition, and method of compounding an animal feed, particularly a poultry feed, utilizing a 1α-hydroxylated vitamin D compound to lower the dietary requirement of inorganic phosphorus in the animal feed. The 1α-hydroxylated vitamin D compounds suitable for this use have been previously described herein. The amount of an inorganic phosphorus supplement that may be incorporated with the feed may be reduced to an amount which provides less than 0.1% P from inorganic phosphorus sources on a dry weight basis. This is a significant reduction from the normal amount of inorganic phosphorus supplement incorporated in animal feed compositions of about 1.5% to about 2.5%. This beneficial reduction in inorganic phosphorus is a direct result of the incorporation of a 1α-hydroxylated vitamin D compound in the animal feed.

The animal feed may be any protein-containing organic meal normally employed to meet the dietary requirements of animals. Many of such protein-containing meals are typically primarily composed of corn, soybean meal or a corn/soybean meal mix. For example, typical commercially available products fed to fowl include Egg Maker Complete, a poultry feed product of Land O' Lakes AG Services, as well as Country Game & Turkey Grower a product of Agwa, Inc. Both of these commercially available products are typical examples of animal feeds with which the present 1α-hydroxylated vitamin D compounds may be incorporated to reduce the amount of supplemental inorganic phosphorus, potassium, calcium, zinc, manganese, magnesium and iron intake required in such compositions. Thus, any type of protein-containing organic meal may be utilized as the base mix to which the 1α-hydroxylated vitamin D compounds and reduced supplemental inorganic phosphorus, potassium, zinc, calcium, manganese, magnesium and iron amounts of the present invention may be incorporated.

The present invention is applicable to the diet of numerous animals, which herein is defined as including mammals, fowl and fish. In particular, the diet may be employed with commercially significant mammals such as pigs, cattle, sheep, goats, laboratory rodents (rats, mice, hamsters and gerbils), fur-bearing animals such as mink and fox, and zoo animals such as monkeys and apes, as well as domestic mammals such as cats and dogs. Typical commercially significant fowl include chickens, turkeys, ducks, geese, pheasants, grouse, ostrich, and quail. Commercially farmed fish such as trout would also benefit from the diet disclosed herein.

In a method of compounding feed for animals in accordance with the present invention, the 1α-hydroxylated vitamin D compounds utilized is incorporated with the animal feed in an amount of from about 5 μg/kg to about 40 μg/kg feed on a dry weight basis. The feed mixture is then fed as a mash or as formed into desired discrete shapes for further processing and packaging. In general, these discrete shapes may be pellets, blocks or briquettes formed by known extrusion and/or compacting techniques. The particular processing technique utilized does not affect the performance of the 1α-hydroxylated vitamin D compounds in the animal feed mixture.

The present invention is more specifically described by the following examples, which are meant to be illustrative only.

Chick Efficacy Trials

A. Procedures:

The best measure of P (or Ca) activity in animals fed a P-deficient diet is total bone ash. In the present bioassay system, young chicks (8 d of age) are fed a corn-soybean meal diet containing 0.6% Ca and 0.43% total P, but an estimated 0.10% bioavailable P. The required levels of Ca and P for chicks of this age are 1.0% Ca and 0.45% available P (i.e., nonphytate P). Calcium is kept at 0.6% instead of 1.0% in our diet because excess Ca in the presence of a severe available P deficiency causes anorexia.

Generally speaking, three or four pens of three or four chicks per pen are placed on each dietary treatment. They are fed the experimental diets free choice for 12 d in wire-screened battery pens located in a environmentally controlled animal room with constant (fluorescent) lighting. At assay termination on d 20 posthatching, chicks are killed by cervical dislocation and the left tibia is quantitatively removed. Bones are stripped of adhering tissue, dried for 24 h at 100° C., weighed and then dry ashed for 24 h at 600° C. (muffle furnace). The portion remaining after ashing is entirely inorganic matter. The weight of ash (mineral matter) as a percent of dry bone weight is percent ash (mineral, and mostly Ca and P) in the bone. Percent ash multiplied by dry bone weight gives total bone ash in milligrams. Tibia ash reflects the degree of ash (or bone mineralization) in the entire skeleton. Our 20-d-old crossbred chicks (New Hampshire x Columbian) fed a diet adequate in Ca and P generally have percent bone ash values of 45%.

For assessment of Zn and Mn bioavailability, bone content of Zn and Mn are the established criteria, but growth responses are also used for assessment of Zn bioavailability (Wedekind et al, 1992; Halpin and Baker, 1986). For assessment of Zn or Mn bioavailability, the tibiae are dried at 100° C. for 24 h, weighed, and then dry ashed at 600° C. for another 24 h. The dried ash is then wet ashed with $HNO_3$ and $H_2O_2$. Zinc and manganese are then quantified using atomic absorption spectrophotometry (Wedekind et al, 1992). In research involving Zn, Mn or Fe (hemoglobin assay) bioavailability, the chicks are fed a pretest diet (0 to d-8 posthatching) that is deficient in Zn, Mn or Fe. This depletes stores of these trace elements. The experiments are then carried out in stainless-steel chick batteries equipped with stainless-steel feeders and waterers. Deionized water is available free choice. These steps are taken to avoid Zn, Mn or Fe contamination from the environment, equipment and drinking water.

B. Results:

The basal diet for the first experiment was designed to be severely deficient in available P (most coming from phytate-bound P) but adequate to excess in vitamin $D_3$, and marginal in both Zn and Mn (i.e., no supplemental Zn or Mn in diet). Increases in bone ash would indicate enhanced GI absorption of P, and increases in bone Zn and Mn would indicate enhanced GI absorption of Zn and Mn (Chung and Baker, 1990; Wedekind et al, 1992; Halpin and Baker, 1986; Baker et al, 1986). As shown in Table 1, growth rate was increased (P<0.05) 17% by 0.10% P addition, 20% by 1200 U phytase addition, 15.5% by 1,25-$(OH)_2D_3$ addition, and 25% by the combination of phytase (1200 U) and 10.0 μg/kg 1,25-(OH)$_2D_3$. Bone ash, however, is the best measure of P bioavailability. Total bone ash (mg) was increased (P<0.01) 56% by 0.10% P addition (proving that P was severely deficient in the diet), 64% with 1200 U phytase, 60% by 1,25-$(OH)_2D_3$, and 98% by the combination of phytase and 1,25-$(OH)_2D_3$. Tibia Zn (μg) was increased (P<0.01) 55% by either 1200 U phytase or 10 μg/kg 1,25-$(OH)_2D_3$, but was increased 86% by the phytase-di-OH $D_3$ combination. Tibia Mn (μg) was increased (P<0.01) 63% by phytase, 85% by di-OH $D_3$ and 123% by the phytase-di-OH $D_3$ combination.

Data in Table 2 show results of a second efficacy trial. The basal diet for this trial was made adequate in Ca, and also was fortified with normal (safety factor) levels of Mn and Zn. It was thus singly deficient in available P. Bone ash was markedly depressed in chicks fed the P-deficient negative control diet. In fact, bone ash percent was about 5% lower (30.4% in Exp. 1, 25.5% in Exp. 2) in these chicks, a reflection of the high ratio of Ca to available P. Efficacy was again demonstrated for both phytase and 1,25-$(OH)_2D_3$. Moreover, the diet containing both phytase and 1,25-(OH)$_2D_3$ produced both ash values that were not far from those achieved with a P adequate diet (diet 5).

Data in Table 3 show results of a classic Zn efficacy trial. The basal diet was singly deficient in Zn (the NRC 1994 Zn requirement is 40 ppm) so that even with 10 ppm Zn addition, the diet was still Zn deficient. Marked efficacy was observed for both phytase and 1,25-$(OH)_2D_3$, and additivity was again evident for the combination.

Having shown conclusively that 1,25-$(OH)_2D_3$ is markedly efficacious in utilization of P, Zn and Mn, a trial was next conducted to test the efficacy of 1-α-OH $D_3$. These results are shown in Table 4. A linear (P<0.01) growth response occurred when 1-α-OH $D_3$ doses between 0 and 20 μg/kg were supplemented. Tibia ash likewise increased (P<0.01) markedly when 1-α-OH $D_3$ was added to the diet. Total tibia ash (mg) was 69% higher in chicks fed the diet with 20 μg/kg 1-α-OH $D_3$ than in those fed the unsupplemented basal diet. A dose of 40 μg/kg 1-αOH $D_3$ was efficacious, and certainly nontoxic, but the 20 μg/kg dose maximized the response attributable to P release from phytate.

Data in Table 5 verify the synergism between the combination of microbial phytase and 1,25-$(OH)_2D_3$. Also, the results demonstrate that when phytase (600 vs. 1200 units) doses are compared in the presence of 10 μg/kg 1,25-(OH)$_2D_3$, 600 units of phytase are as effective as 1200 units in improving phytate-P utilization. This finding when compared to the data of Exp. 1 (Table 1) indicates that the phytase supplementation level required for maximum response can be cut in half if a supplemental bioactive 1-α-OH vitamin D compound is also included in the diet. In fact, only 300 units of phytase produced a marked response in the presence of 1,25-$(OH)_2D_3$.

Data in Table 6 show that synergism exists between 1-α-OH $D_3$ and phytase. Thus, 20 μg/kg 1-α-OH $D_3$ combined with 1200 units of phytase increased total bone ash by 107% over that observed for the basal unsupplemented corn-soybean meal diet. Supplemental 1-α-OH $D_3$ alone increased bone ash by 74%, and supplemental phytase alone increased bone ash by 65%.

The principle objectives of the experiments reported in Table 7 were: 1) to show that 1α-OH $D_3$ will lower P excretion in feces and urine, and 2) to ascertain whether 1α-OH $D_3$ addition to diets will increase the utilization of inorganic or nonphytate P. Accordingly, in these experiments a P-deficient, amino acid-based purified diet, devoid of vitamin $D_3$, was used which involved triplicate groups of four female New Hampshire x Columbian checks for each of the dietary treatments. The basal diet contained no phytate P. Supplemental inorganic P from $KH_2PO_4$ (0.075%) was fed, and the diet containing nonphytate P was repeated with 10 or 20 μg/kg 1α-OH $D_3$. The objective was to ascertain whether 1α-OH-$D_3$ will increase utilization of P when the P is available only from inorganic sources (nonphytate P) and whether 10 μg/kg 1α-OH $D_3$ was adequate to facilitate maximal utilization of the nonphytate P. Weight gain and bone ash were the primary response criteria.

The data in Table 7 show that 1μ-OH $D_3$ supplementation markedly increases both chick weight gain and chick bone ash, because it increases the utilization of inorganic P (nonphytate P) per se. Chicks fed diets containing only inorganic P (nonphytate P from $KH_2PO_4$) responded maximally to 10 μg/kg (or less) 1α-OH $D_3$. Doubling the level of the 1α-OH-$D_3$ compound did not elicit further bone ash responses. This suggests that the 10 μg/kg level of 1α-OH-$D_3$ used in this experiment was more-than-adequate to promote optimal absorption of the inorganic nonphytate P in the chick's diet.

TABLE 1

Phytase and 1,25-Dihydroxycholecalciferol Increase Growth Rate and Bone Strength of Young Chicks Fed a Phosphorus-Deficient Diet (Exp. 1)[1]

| Diet[2] | Weight gain (g) | Gain feed (g/kg) | Avail. P intake (mg) | Tibia data[3] | | | | | | |
|---|---|---|---|---|---|---|---|---|---|---|
| | | | | Weight (mg) | Ash (%) | Ash (mg) | Zn (μg/g) | Zn (μg) | Mn (μ/g) | Mn (μg) |
| Phosphorus titration[4] | | | | | | | | | | |
| 0 | 193 | 644 | 300 | 667 | 30.4 | 203 | | | | |
| 0.05% P | 200 | 640 | 468 | 717 | 35.4 | 254 | | | | |
| 0.10% P | 226 | 657 | 688 | 827 | 38.3 | 317 | | | | |
| Phytase titration | | | | | | | | | | |
| 0 | 193 | 644 | 300 | 667 | 30.4 | 203 | 142 | 95 | 2.32 | 1.55 |
| 300 μ phytase[5] | 202 | 647 | 312 | 729 | 33.9 | 247 | 145 | 105 | | |
| 600 μ phytase | 206 | 661 | 312 | 735 | 35.8 | 263 | 159 | 117 | 2.66 | 1.96 |
| 900 μ phytase | 224 | 664 | 338 | 805 | 38.2 | 308 | 171 | 137 | | |
| 1200 μ phytase | 231 | 679 | 340 | 848 | 39.3 | 333 | 173 | 147 | 3.00 | 2.53 |
| Factorial | | | | | | | | | | |
| 1. 0 | 193 | 644 | 300 | 667 | 30.4 | 203 | 142 | 95 | 2.32 | 1.55 |
| 2. 1200 U phytase[5] | 231 | 679 | 340 | 848 | 39.3 | 333 | 173 | 147 | 3.00 | 2.53 |
| 3. 10 μg/kg DiOH-$D_3$[6] | 223 | 683 | 326 | 816 | 39.6 | 324 | 179 | 147 | 3.52 | 2.87 |
| 4. As 2 + 3 | 241 | 707 | 340 | 932 | 43.1 | 402 | 190 | 177 | 3.85 | 3.46 |
| Pooled SEM | 3.3 | 6.7 | | 14 | .5 | 7.0 | 4.1 | 4.4 | .10 | .08 |

Table 1 footnotes on next page.

TABLE 2

Effects of Phytase and 1,25 Dihydroxycholecalciferol on Performance and Bone Characteristics of Chicks Fed Diets Deficient in Phosphorus and Adequate in Calcium (Exp. 2)[1]

| Diet | 12-d weight gain (g) | Gain feed (g/kg) | Avail. P intake (mg) | Tibia data[2] | | | | | | |
|---|---|---|---|---|---|---|---|---|---|---|
| | | | | Weight (mg) | Ash (%) | Ash (mg) | Zn (μg/g) | Zn (μg) | Mn (μ/g) | Mn (μg) |
| 1. Basal (B)[3] | 172 | 649 | 266 | 598 | 25.5 | 152 | 146 | 88 | 3.29 | 1.98 |
| 2. B + 1200μ phytase[4] | 218 | 678 | 322 | 780 | 37.5 | 292 | 219 | 171 | 4.82 | 3.76 |
| 3. B + 10 μg/kg diOH-$D_3$[5] | 201 | 686 | 293 | 698 | 36.1 | 253 | 199 | 139 | 5.29 | 3.69 |
| 4. As 2 + 3 | 219 | 702 | 311 | 847 | 42.5 | 360 | 216 | 183 | 5.86 | 4.96 |
| 5. B + .45% P[6] | 244 | 688 | 1952 | 959 | 45.3 | 435 | 189 | 181 | 3.54 | 3.39 |
| Pooled SEM | 4.4 | 7.1 | 22 | .45 | 9.5 | 5 | 6 | .13 | .12 | |

[1]Data represent mean values per chick of four replicates (pens) of three chicks during the period 8 to 20-d posthatching; average initial weight was 83 g.
[2]Intact left tibia (dry basis).
[3]The basal corn-soybean meal diet (23% CP) contained .10% available P and 1.0% Ca. Both Mn and Zn were provided as supplements to this basal diet (50 mg/kg of each) such that the basal diet was singly deficient in available P.
[4]See footnote 5 of Table 1.
[5]See footnote 6 of Table 1.
[6]Provided from $KH_2PO_4$.

TABLE 3

Efficacy of Phytase and 1,25 Di—OH—D₃ in Chicks Fed a Zn-Deficient Diet (Exp. 3)[1]

| Diet[2] | 12 days gain (g) | Tibia Zn (μ/g) | Tibia Zn (μ/g) |
|---|---|---|---|
| 1. Basal diet | 169 | 44.7 | 34.2 |
| 2. As 1 + 1200 U phytase | 209 | 62.2 | 54.9 |
| 3. As 1 + 10 μg/kg Di—OH—D₃ | 201 | 60.3 | 53.1 |
| 4. As 2 + 3 | 241 | 88.4 | 88.7 |
| 5. As 1 + 5 ppm Zn(ZnSO₄.7H₂O) | 210 | 61.5 | 54.2 |
| 6. As 2 + 10 ppm Zn(ZnSO₄.7H₂O) | 236 | 73.7 | 71.1 |
| Pooled SEM | 8 | | 2.7 |

[1]Data are means of four pens, each containing four male chicks weighing 84.5 g at day 8 posthatching; 12-d feeding period in stainless-steel batteries with chicks receiving deionized water. During the 8-d pretest period, chicks were fed a low Zn soybean meal diet.
[2]Soy concentrate-dextrose diet containing 13 ppm Zn.

TABLE 4

Dietary Addition of 1-α-hydroxycholecalciferol Increases Phytate-Phosphorus Utilization (Exp. 4)[1]

| Dietary Level of 1-α-OH—D₃ (μg/kg) | 12-d weight gain[3] (g) | Gain feed[3] (g/kg) | Tibia Data[3] Weight (mg) | Ash (%) | Ash (mg) |
|---|---|---|---|---|---|
| 0 | 228[b] | 645[b] | 724[c] | 33.0[b] | 238[c] |
| 10 | 255[a] | 676[a] | 917[b] | 38.9[a] | 356[b] |
| 20 | 266[a] | 681[a] | 992[a] | 40.5[a] | 402[a] |
| 40 | 255[a] | 677[a] | 878[b] | 41.1[a] | 361[b] |
| Pooled SEM | 3.6 | 6.5 | 21 | .75 | 7.6 |

[1]Means of three pens of four chicks during the period 8 to 20 days posthatching.
[2]Added to a corn-soybean meal diet (23% CP) containing adequate vitamin D-3, 0.60% Ca and 0.43% P (0.10% estimated available P).
[3]Means within columns with unlike superscript letters are significantly (P < 0.5) different.

TABLE 5

Performance and Bone Ash of Chicks Fed 1,25-Dihydroxycholecalciferol in the Absence or Presence of Three Levels of Microbial Phytase (Exp. 5)[1]

| Dietary addition[2] | Weight gain[3] (g) | Food intake (g) | Tibia data[3] Weight (mg) | Ash (%) | Ash (mg) |
|---|---|---|---|---|---|
| 1. None | 203[c] | 314[c] | 672[b] | 32.9[d] | 238[d] |
| 2. 10 μg/kg di-OH—D₃ | 234[b] | 338[b] | 825[b] | 42.2[c] | 348[c] |
| 3. As 2 + 300 U phytase | 244[a] | 349[a,b] | 881[a,b] | 42.5[b,c] | 375[b] |
| 4. As 2 + 600 U phytase | 251[a] | 361[a] | 903[a] | 43.9[a,b] | 396[a,b] |
| 5. As 2 + 1200 U phytase | 252[a] | 356[a] | 886[a] | 44.7[a] | 396[a,b] |
| Pooled SEM | 3.6 | 4.6 | 20 | 0.5 | 9.0 |

[1]Data are means for four pens of four female chicks that were fed the experimental diets during the period 8 to 20 d posthatching; average initial weight was 93 g. Means in columns with different superscripts letters are significantly different (P < 0.05).
[2]The basal diet (Table 1) contained, by analysis, 0.43% P (0.10% estimated available P), 0.63% Ca and 23% crude protein.
[3]Dry-weight basis.

TABLE 6

Evaluation of 1-α-Hydroxycholecalciferol With and Without Phytase on Phosphorus Utilization[1]

| Dietary addition | Weight gain g | Food intake g | Tibia data Weight mg | Ash g/100 g | Ash mg |
|---|---|---|---|---|---|
| 1. None | 195[c] | 306[b] | 634[c] | 29.1[c] | 185[c] |
| 2. 0.10 g P/100 g (KH₂PO₄) | 239[a,b] | 355[a] | 801[b] | 38.7[b] | 310[b] |
| 3. 1200 U phytase | 245[a,b] | 356[a] | 795[b] | 38.5[b] | 306[b] |
| 4. 20 μg/kg 1-α-OH—D₃ | 235[b] | 343[a] | 787[b] | 40.9[a] | 321[b] |
| 5. As 3 + 4 | 253[a] | 363[a] | 897[a] | 42.7[a] | 384[a] |
| Pooled SEM | 5.5 | 6.6 | 18 | 0.7 | 11 |

[1]Data are means of three pens of four female chicks that are fed the experimental diets during the period 8 to 20 d posthatching; average initial weight was 88 g. Means in columns with different superscript letters are significantly different (P < 0.05).
[2]The basal corn-soybean meal diet contained, by analysis, 0.43 g P/100 g (0.10 g/100 g estimated nonphytate P), 0.63 g Ca/100 g and 23.9 g CP/100 g.
[3]Dry weight basis.

TABLE 7

EFFICACY OF 1α-OH D3 IN IMPROVING NONPHYTATE PHOSPHORUS UTILIZATION IN CHICKS

| Diet[b] | Weight gain, g | Gain:feed, g/kg | Tibia ash % | mg |
|---|---|---|---|---|
| 1. Basal (P and D₃-deficient) | 130[e] | 615[d] | 27.7[g] | 128[e] |
| 2. As 1 + .075% P (KH₂PO₄) | 177[c,d] | 697[c] | 31.5[f] | 177[d] |
| 3. As 2 + 10 μg/kg 1α-OH D₃ | 187[c] | 615[d] | 34.3[c,d,e] | 225[c] |
| 4. As 2 + 20 μg/kg 1α-OH D₃ | 185[c] | 632[d] | 33.3[e,f] | 211[c] |
| Pooled SEM | 8 | 16 | .6 | 9 |

[a]Data are means of triplicate groups of four female New Hampshire × Columbian chicks; average initial weight was 84 g; 8 to 20-d posthatching assay.
[b]The basal diet contained .50% Ca, .10% P, and 0 μg/kg cholecalciferol.
[c,d,e,f,g]Means with different superscript letters are different (P < .05).

We claim:

1. A poultry feed additive composition comprising:

a nonphytate phosphorus additive for poultry feed containing an inorganic phosphorus supplement that supplies less than 0.1% inorganic phosphorus by weight to said poultry feed; and an effective amount of a 1α-hydroxylated vitamin D compound for utilizing inorganic phosphorus from said inorganic phosphorus supplement in said poultry feed.

2. The composition of claim 1 wherein said effective amount of the 1α-hydroxylated vitamin D compound comprises about 5 μg/kg to about 40 μg/kg of said feed.

3. The composition of claim 1 wherein said inorganic phosphorus supplement is selected from the group consisting of monocalcium phosphate, dicalcium phosphate, defluorinated phosphate and mixtures thereof.

4. The composition of claim 1 wherein said poultry is selected from the group consisting of chickens, turkeys, geese, ducks, pheasant, grouse, quail, and ostrich.

5. The composition of claim 1 wherein said 1α-hydroxylated vitamin D compound is characterized by the following general structure

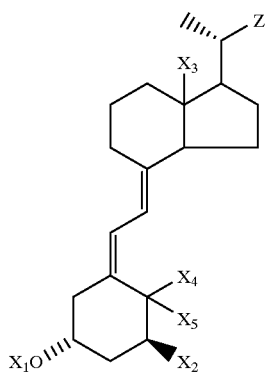

where $X_1$ may be hydrogen or a hydroxy-protecting group, $X_2$ may be hydroxy, or protected hydroxy, $X_3$ may be hydrogen or methyl, $X_4$ and $X_5$ each represent hydrogen or taken together $X_4$ and $X_5$ represent a methylene group, and where Z is selected from Y, —OY, —CH$_2$OY, —C≡CY and —CH=CHY, where the double bond may have the cis or trans stereochemical configuration, and where Y is selected from hydrogen, methyl, —CR$_5$O and a radical of the structure:

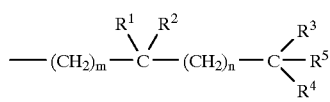

where m and n, independently, represent integers from 0 to 5, where $R^1$ is selected from hydrogen, hydroxy, protected-hydroxy, fluoro, trifluoromethyl, and $C_{1-5}$-alkyl, which may be straight chain or branched and, optionally, bear a hydroxy or protected-hydroxy substituent, and where each of $R^2$, $R^3$ and $R^4$, independently, is selected from hydrogen, fluoro, trifluoromethyl and $C_{1-5}$ alkyl, which may be straight-chain or branched, and optionally bear a hydroxy or protected-hydroxy substituent, and where $R^1$ and $R^{2,}$ taken together, represent an oxo group, or an alkylidene group, =CR$_2$R$_3$, or the group —(CH$_2$)$_p$—, where p is an integer from 2 to 5, and where $R^3$ and $R^{4,}$ taken together, represent an oxo group, or the group —(CH$_2$)$_q$—, where q is an integer from 2 to 5, and where $R^5$ presents hydrogen, hydroxy, protected-hydroxy, or $C_{1-5}$ alkyl.

6. The composition of claim 1 wherein the vitamin D compound is 1α-hydroxyvitamin $D_3$.

7. The composition of claim 1 wherein the vitamin D compound is 1α,25-dihydroxyvitamin $D_3$.

8. A method of increasing utilization of inorganic phosphorus contained in an inorganic phosphorus supplement present in an animal feed, comprising the steps of:

providing a nonphytate phosphorus animal feed additive containing an inorganic phosphorus supplement and incorporating with said additive an effective amount of a 1α-hydroxylated vitamin D compound for utilizing inorganic phosphorus from the inorganic phosphorus supplement.

9. The method of claim 8 further including the step of incorporating said additive as a top dressing on said feed.

10. The method of claim 8 wherein said effective amount of the 1α-hydroxylated vitamin D compound comprises about 5 μg/kg to about 40 μg/kg of said feed.

11. The method of claim 8 further including the step of incorporating an effective amount of phytase with said additive.

12. The method of claim 11 wherein said effective amount of phytase comprises from about 300 units to about 1,200 units per kilogram of feed.

13. The method of claim 11 wherein said effective amount of phytase comprises about 600 units per kilogram of feed.

14. The method of claim 8 wherein said 1α-hydroxylated vitamin D compound is characterized by the following general formula:

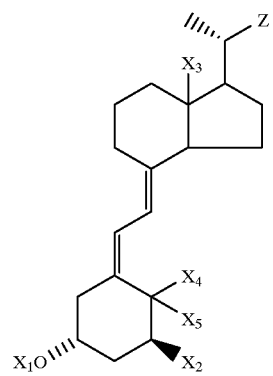

where $X_1$ may be hydrogen or a hydroxy-protecting group, $X_2$ may be hydroxy, or protected hydroxy, $X_3$ may be hydrogen or methyl, $X_4$ and $X_5$ each represent hydrogen or taken together $X_4$ and $X_5$ represent a methylene group, and where Z is selected from Y, —OY, —CH$_2$OY, —C≡CY and —CH=CHY, where the double bond may have the cis or trans stereochemical configuration, and where Y is selected from hydrogen, methyl, —CR$_5$O and a radical of the structure:

$$—(CH_2)_m—\overset{R^1}{\underset{R^2}{C}}—(CH_2)_n—\overset{R^3}{\underset{R^4}{C}}—R^5$$

where m and n, independently, represent integers from 0 to 5, where $R^1$ is selected from hydrogen, hydroxy, protected-hydroxy, fluoro, trifluoromethyl, and $C_{1-5}$-alkyl, which may be straight chain or branched and, optionally, bear a hydroxy or protected-hydroxy substituent, and where each of $R^{2,}$ $R^3$ and $R^{4,}$ independently, is selected from hydrogen, fluoro, trifluoromethyl and $C_{1-5}$ alkyl, which may be straight-chain or branched, and optionally bear a hydroxy or protected-hydroxy substituent, and where $R^1$ and $R^{2,}$ taken together, represent an oxo group, or an alkylidene group, =CR$_2$R$_{3,}$ or the group —(CH$_2$)$_p$—, where p is an integer from 2 to 5, and where $R^3$ and $R^{4,}$ taken together, represent an oxo group, or the group —(CH$_2$)$_q$—, where q is an integer from 2 to 5, and where $R^5$ presents hydrogen, hydroxy, protected-hydroxy, or $C_{1-5}$ alkyl.

15. The method of claim 8 wherein the vitamin D compound is 1α-hydroxyvitamin $D_3$.

16. The method of claim 8 wherein the vitamin D compound is 1α,25-dihydroxyvitamin $D_3$.

17. The method of claim 8 further including the step of formulating said animal feed additive for poultry.

18. The method of claim 17 wherein said poultry is selected from the group consisting of chickens, turkeys, geese, ducks, pheasant, grouse, quail and ostrich.

* * * * *